United States Patent [19]
Sun et al.

[11] Patent Number: 5,808,272
[45] Date of Patent: *Sep. 15, 1998

[54] LASER SYSTEM FOR FUNCTIONAL TRIMMING OF FILMS AND DEVICES

[75] Inventors: Yunlong Sun; Edward J. Swenson, both of Portland, Oreg.

[73] Assignee: Electro Scientific Industries, Inc., Portland, Oreg.

[*] Notice: The term of this patent shall not extend beyond the expiration date of Pat. No. 5,685,995.

[21] Appl. No.: 959,140

[22] Filed: Oct. 28, 1997

Related U.S. Application Data

[63] Continuation of Ser. No. 538,073, Oct. 2, 1995, Pat. No. 5,685,995, which is a continuation-in-part of Ser. No. 343,779, filed as PCT/US93/08484, Sep. 10, 1993 published as WO94/06182, Mar. 17, 1994, Pat. No. 5,569,398.

[51] Int. Cl.⁶ .................................................. B23K 26/00
[52] U.S. Cl. ...................................... 219/121.68; 438/799
[58] Field of Search ........................ 219/121.68, 121.69, 219/121.83; 438/462, 463, 662, 799, 940

[56] References Cited

U.S. PATENT DOCUMENTS

| | | | |
|---|---|---|---|
| 4,172,741 | 10/1979 | Johnson | 148/1.5 |
| 4,182,024 | 1/1980 | Cometta | 29/571 |
| 4,228,528 | 10/1980 | Cenker et al. | 365/200 |
| 4,288,776 | 9/1981 | Holmes | 338/308 |
| 4,399,345 | 8/1983 | Lapham et al. | 219/121 |
| 4,598,039 | 7/1986 | Fischer et al. | 430/323 |
| 4,656,635 | 4/1987 | Baer et al. | 372/27 |
| 4,705,698 | 11/1987 | Van Dine | 427/53.1 |
| 4,708,747 | 11/1987 | O'Mara, Jr. | 437/19 |
| 4,731,795 | 3/1988 | Clark et al. | 372/107 |
| 4,761,786 | 8/1988 | Baer | 372/10 |
| 4,791,631 | 12/1988 | Baumert et al. | 372/22 |
| 4,792,779 | 12/1988 | Pond et al. | 338/195 |
| 4,810,049 | 3/1989 | Fischer et al. | 350/96.12 |

(List continued on next page.)

FOREIGN PATENT DOCUMENTS

| | | |
|---|---|---|
| 2103884 | 2/1983 | United Kingdom . |
| 06182 | 3/1994 | WIPO . |

OTHER PUBLICATIONS

1995 "Optimization of Memory Redundancy Laser Link Processing," Sun et al.

1995 "New Laser Technology Addresses the Yield Enhancement Challenge of the Evolving Generation of Memory Devices," Hutchens.

1993 "Application of a Binary Diffractive Optic for Beam Shaping in Semiconductor Processing by Lasers," Cordingley.

1991 "Focused Ion Beams," Orloff.

1990 "Polysilicon Resistor Trimming by Laser Link Making," Parker et al.

1989 "Reliability Aspects of Laser Programmable Redundancy: Infrared v. Green, Polysilicon v. Silicide," Chlipala & Scarfone.

1989 "Polycrystalline Silicon Resistor Trimming by Laser Annealing," Crowley.

(List continued on next page.)

*Primary Examiner*—Geoffrey S. Evans
*Attorney, Agent, or Firm*—Stoel Rives LLP

[57] ABSTRACT

A laser system (50) and processing method exploit a wavelength range (40) in which devices, including any semiconductor material-based devices (10) affected by conventional laser wavelengths and devices having light-sensitive or photo-electronic portions integrated into their circuits, can be effectively functionally trimmed without inducing performance drift or malfunctions in the processed devices. True measurement values of operational parameters of the devices can, therefore, be obtained without delay for device recovery, i.e., can be obtained substantially instantaneously with laser impingement. Accordingly, the present invention allows faster functional laser processing, eases geometric restrictions on circuit design, and facilitates production of denser and smaller devices.

12 Claims, 5 Drawing Sheets

U.S. PATENT DOCUMENTS

| | | | |
|---|---|---|---|
| 4,853,758 | 8/1989 | Fischer | 357/51 |
| 4,930,901 | 6/1990 | Johnston et al. | 372/26 |
| 4,942,582 | 7/1990 | Kintz et al. | 372/18 |
| 4,965,803 | 10/1990 | Esterowitz et al. | 372/5 |
| 4,970,369 | 11/1990 | Yamazaki et al. | 219/121.69 |
| 4,987,286 | 1/1991 | Allen | 219/121.68 |
| 5,057,664 | 10/1991 | Johnson et al. | 219/121.69 |
| 5,066,998 | 11/1991 | Fischer et al. | 357/51 |
| 5,091,991 | 2/1992 | Tulip et al. | 372/4 |
| 5,096,850 | 3/1992 | Lippitt, III | 437/173 |
| 5,185,291 | 2/1993 | Fischer et al. | 437/173 |
| 5,260,963 | 11/1993 | Baird et al. | 372/95 |
| 5,265,114 | 11/1993 | Sun et al. | 372/69 |
| 5,296,674 | 3/1994 | Praschek et al. | 219/121.69 |
| 5,420,515 | 5/1995 | Uhling et al. | 324/601 |
| 5,473,624 | 12/1995 | Sun | 372/69 |
| 5,569,398 | 10/1996 | Sun et al. | 219/121.68 |
| 5,611,946 | 3/1997 | Leong et al. | 219/121.68 |
| 5,623,449 | 4/1997 | Fischer et al. | 315/200 |

OTHER PUBLICATIONS

1989 "Explosion of Poly–Silicide Links in Laser Programmable Redundancy for VLSI Memory Repair," Lu, Chipala, Scarfone.

1989 "Computer–Simulated Explosion of Poly–Silicide Links in Laser–Programmable Redundancy for VLSI Memory Repair," Chlipala, Scarfone.

1987 "Laser Processing for Application Specific Integrated Circuits (ASICs)," Smart & Stewart.

1986—Graphs of Absportance of Al, Pt, Ni, W v. Wavelengh.

1986 "Computer Simulation of Target Link Explosion in Laser Programmable Redundancy for Si Memory," Scarfone & Chlipala.

1984 "Consideration of Laser Material Interactions for the Trimming of Thin Film Resistors," Smart.

1983 "Laser Adjustment of Linear Monolithic Circuits," Litwin & Smart.

1982 "Semiconductor Processing Applications with Lasers," Kestenbaum.

1982 "Laser–Assisted Poly–Si Resistor Fuse Utilizing Silicon Lateral Flow," Iwai et al.

1981 "Laser Programmable Redundancy and Yield Improvement in a 64k DRAM," Smith et al.

1981 "Laser Beam Precessing," Cable.

1981 "A Technique for Automatic Focusing and Alignment of Monolithic Circuits for Laser Trimming, " Wells et al.

1980 "Photoexcitation Effects During Laser Trimming of Thin–Film Resistors on Si," Kestenbaum & Baer.

Sep. 1980 "Lasers in Semiconductor Processing," Burggraaf.

1979 "Reliability of LSI Memory Circuits Exposed to Laser Cutting," Rand.

1979 "Interference Effects in Laser Micromachining of Thin Films of Silicon," Kestenbaum.

1979 "A Fault–Tolerant 64k Dynamic Ram," Cenker et al.

1978 "Effects of Vapor Plasma on the Coupling of Laser Radiation with Al Targets," Shui et al.

1978 "A Passive Laser–Trimming Technique to Improve the Linearity of a 10–bit D/A Converter," Price.

1977 "Laser Vaporization of Metal Films—Effect of Optical Interference in Underlying Dielectric Layers," North.

1976 "A Passive Laser–Trimming Technique to Improve D/A Linearity," Price.

1975 "Connections and Disconnections on Integrated Circuits Using Nanosecond Laser Pulses," Cook et al.

1974 "An Overview of Laser Functional Trimming Techniques," Hurtig & Swenson (ESI).

1974—"Algorithmic Trimming on Active Circuitry," Faber.

1965—Graph of Transmission & Absorption of Crystals & Glasses.

1988 "Laser Programming of Gallium Arsenide HFET Digital Integrated Circuits," Fischer.

1980 "Trimming Behavior and Post–Trim Characteristics of $Ta_2N$ resistors on Silicon, " Kestenbaum and Baer.

1979 "Interference Effects in Laser Micromachining of Thin Films on Silicon," Kestenbaum.

1979 "A Fault–Tolerant 64k Dynamic Random–Access Memory," Cenker et al.

1976 "Laser Coding of Bipolar Read–Only Memories," North and Weick.

Dow et al., "Reducing Post–Trim Drift of Thin–Film Resistors by Optimizing YAG Laser Output Characteristics," *IEEE Transactions on Components, Hybrids and Mfg. Technology*, vol. Ch–1, No. 4, Dec. 1978, pp. 392–397.

Gillespie et al. *Applied Optics*, vol. IV, pp. 1488 (1985).

Jellison, Jr. G.E. et al., "Optical Properties of Heavily Doped Silicon Between 1.5 and 4.1 eV, " Physical Review Letters, vol. 46, No. 21., (May 1981), Pub. by The American Physical Society, pp. 1414–1417.

Chih–Youan Lu et al., IEEE, Transactions on Electron Devices, vol. 36, No. 6, pp. 1056–1061 (Jun. 1989).

Michael J. Mueller, "Functional Laser Trimming of Thin Film Resistors on Silicon ICs," SPIE vol. 611, Laser Processing of Semiconductors and Hybrids (1986), pp. 70–83.

SPIE, vol. 611, Laser Processing of Semiconductors and Hybrids (1986), pp. 12–13.

R. H. Wagner, "Functional Laser Trimming an Overview," Proceedings of SPIE—The International Society for Optical Engineering, vol. 611, 21–22 Jan. 1986, Los Angles, pp.8–17.

Weber, "Handbook of Laser Science and Technology," *Optical Materials*: Part II, CRC Press (Oct. 1986).

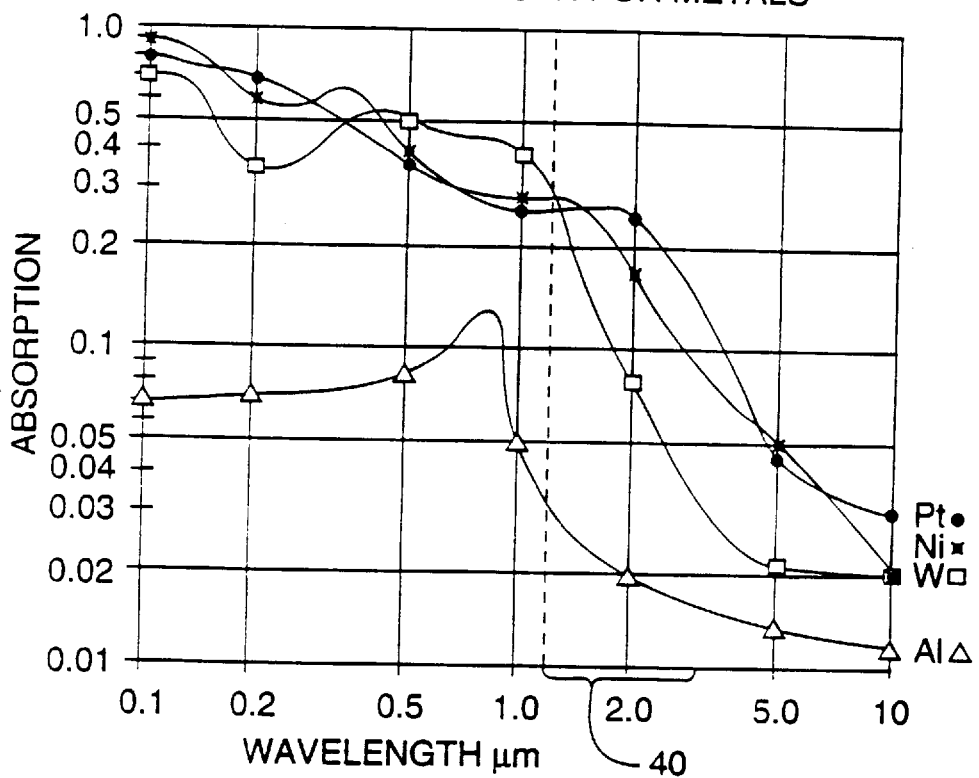

LASER SYSTEM FOR FUNCTIONAL TRIMMING OF FILMS AND DEVICES

This is a continuation of U.S. patent application Ser. No. 08/538,073, filed Oct. 2, 1995, now U.S. Pat. No. 5,685,995, which is continuation-in-part of U.S. patent application Ser. No. 08/343,779, filed Nov. 22, 1994, now U.S. Pat. No. 5,569,398, which is a continuation-in-part of International Patent Application No. PCT/US93/08484, filed Sep. 10, 1993, pub. as WO94/06182 on Mar. 17, 1994.

TECHNICAL FIELD

The present invention relates to methods and laser systems for functionally processing one or more materials of a single or multiple layer structure of a multimaterial, multilayer device and, in particular, to processing methods and laser systems that employ a laser output within a wavelength range that facilitates functional modification of a resistive or capacitive film structure of an integrated circuit having substrates or components including material such as silicon, germanium, or other semiconductor materials.

BACKGROUND OF THE INVENTION

Conventional laser systems are typically employed for processing targets such as electrically resistive or conductive films of passive component structures, such as film resistors, inductors, or capacitors, in integrated circuits on silicon wafers or ceramic base plates. Laser processing is presented herein only by way of example to film trimming and may include any form of laser ablative removal of target material.

FIG. 1 is a plan view of a portion of a prior art integrated circuit 10 depicting resistors 12a and 12b (generally, resistor 12) having a patterned resistor path 14 between metal contacts 16. The resistance value of a resistor 12 is largely a function of the pattern geometry, the path length between contacts 16, and the thickness of material composing resistor 12.

An "L-cut" 15 on resistor 12a depicts a typical laser-induced modification. In an L-cut 15, a first strip of resistive material is removed in a direction perpendicular to a line between the contacts to make a coarse adjustment to the resistance value. Then an adjoining second strip, perpendicular to the first strip, may be removed to make a finer adjustment to the resistance value. A "serpentine cut" 17 on resistor 12b depicts another common type or laser adjustment. In a serpentine cut 17, resistor material is removed along lines 18 to increase the length of path 14. Lines 18 are added until a desired resistance value is reached.

FIG. 2 is a cross-sectional side elevation view depicting a conventional output energy distribution of a laser output or pulse 20 directed at a resistive film structure 22 such as resistor 12. With reference to FIGS. 1 and 2, resistive film structures 22 typically comprise a thin film layer 24 of a resistive material such as nichrome, tantalum nitride, cesium silicide, or silicon chromide that is layered upon a substrate 26 such as silicon, germanium, or other semiconductor or ceramic materials. Alternatively, thin film layer 24 may be applied to an epitaxial, junction, or passivation layer 28. Thin film layer 24 may be covered by a protective layer 30, such as a dielectric, which may be necessitated by an IC processing requirement or may be desired for containing laser trimming by-products or slag from splattering other integrated circuit elements. Integrated circuit 10 and resistive film structure 22 may also be composed of several materials including those required for passivation, coating, binding, or other manufacturing purposes.

Skilled persons will appreciate that if the film is a conductive film and part of an electrode of a capacitor component, the effective area of the film can be adjusted by punching holes in or trimming the film to reduce the capacitance of the film until it reaches a predetermined capacitance value.

In "passive processing," the process of modifying resistive or conductive films to provide circuit elements having predetermined capacitive or resistance values is based upon directly measuring the value of the elements without powering-up or operating the whole circuit. This process involves measuring the circuit element during or following each trimming operation and ceasing when the predetermined value is obtained.

However, measurement access to individual components is becoming limited as the complexity of electronic circuitry and devices increases and their sizes decrease. The term "device" is used herein to refer to an electronic component, a circuit, a collection of circuits, or entire contents of an electronic chip or die. Even when certain individual passive components can be accessed, measured, and adjusted to their predetermined values, the whole device or circuit may not perform within specified operational parameters. Under such circumstances, functional laser processing may be a more desirable option.

In "functional processing", the whole circuit or device is activated to its normal operating condition, and then its performance is evaluated by using relevant input signal generating equipment and output measurement equipment such as a voltmeter. Then, the structures of one or several components, such as resistors, capacitors, or inductors, of the device are adjusted by the laser to "tune" the performance of the device. Evaluation of the device function and adjustment of the device components are repeated incrementally until the device performs to specification. For example, functionally processing a voltage regulator entails applying normal power supply voltage(s) to the voltage regulator, measuring its output voltage with a voltmeter between one or a series of laser pulses, and sending the output voltage value to a system computer. The computer compares the output value of the device to a pre-set value, determines whether additional adjustments are necessary, and controls laser operation until the device achieves operation within predetermined operational tolerances.

Functional processing is widely employed for trimming A/D and D/A converters, voltage regulators, operational amplifiers, filter circuits, photodetection circuits, and other circuits or devices. These devices are typically built on semiconductor material, such as silicon or germanium, or as hybrid integrated circuits in which the laser target is on either semiconductor or ceramic wafers, and are densely packed with other semiconductor-based active (gain-oriented) devices or multimodule circuits. Functional processing is described in detail by R. H. Wagner, "Functional Laser Trimming: An Overview," *Proceedings of SPIE*, Vol. 611, January 1986, at 12–13, and M. J. Mueller and W. Mickanin, "Functional Laser Trimming of Thin Film Resistors on Silicon ICs," *Proceedings of SPIE*, Vol. 611, January 1986, at 70–83. Examples of passive and functional processing laser systems include Model Nos. 4200, 4400, and 6100, manufactured by Electro Scientific Industries, Inc., which is the assignee of the present application. These systems typically utilize output wavelengths of 1.064 $\mu$m, 1.047 $\mu$m, and 0.532 $\mu$m.

Because functional processing considers whole device performance instead of the value of a particular component, functional processing with conventional laser outputs such as 1.064 µm, 1.047 µm, or their harmonics presents a problem that is generally not relevant during passive processing. These conventional laser wavelengths tend to cause optoelectric responses in the semiconductor material that affect the device and often result in performance drift or complete malfunction of the device. Extraneous scattered laser light may impinge on adjacent active devices (such as P-N junctions or field effect transistors (FETs) or any semiconductor material-based structures) and affect their performance due to excitation of carriers in the structure, resulting in performance drift or malfunction of the device during functional trimming. The scattered light induced performance drifting or malfunctions occur even for devices having targets on ceramic substrates whenever the adjacent circuits are semiconductor material-based. The mechanism and extent of performance drift or malfunction depends greatly on the specific design of the device. Additional carrier excitement within the semiconductor substrate or semiconductor material-based device may, therefore, be a major contributor to these performance drifts or malfunctions. While these optoelectric responses may occur during passive trimming, these responses do not generally affect the value of the target component.

Thus, functional laser processing with these wavelengths is usually extremely slow because extra time is required to let the device recover from drifting or malfunction before a measurement of the device will indicate "true" performance of the device. This is also true for integrated circuit (IC) or hybrid integrated circuit (HIC) devices having photo-receptive or light-sensing portions or photo-electronic components such as photodiode or charge-coupled device (CCD) arrays.

FIG. 3 is an oscilloscope trace 34 showing performance drifting of an output voltage 36 of a typical activated voltage regulator device undergoing conventional laser functional processing with laser output pulses of 1.047 µm at 2.01 kHz. With reference to FIG. 3, voltage output 36 of the device dramatically dips momentarily by about 0.5 volt after a laser pulse impinges one of its target structures. Then, a 0.5-millisecond interval is required for the device to recover from the output voltage dip before a meaningful measurement can be accomplished. This recovery period is often referred to as "settling time." Skilled persons will appreciate that the settling time interval will vary as a function of most device variables, such as circuit type, layout, structure, and composition and type of output measured.

Special system software must be developed to enable the entire system to wait for a sufficient time interval after each laser pulse or series of pulses for the performance shifting to dissipate, and then initiate the performance measurement of the device. Based upon the measurement results, the computer control system then determines whether an additional laser pulse or pulses should be fired on the target component. In certain cases, the entire device may be "latched up" in response to a laser pulse. Under these circumstances, the software must disconnect the input power from the device so that it is totally off, wait for a certain time interval, and turn the power on again to return the device to normal operation.

SUMMARY OF THE INVENTION

An object of the present invention is, therefore, to provide a laser system and method that facilitate functional processing of active or passive devices.

Another object of the invention is to provide a method for modifying with laser output a measurable operational parameter of an activated electronic device while preventing a spurious optoelectric response in the device, the device including a target material and a nontarget material positioned within optical proximity to the target material, the laser output including a laser pulse having a spatial distribution of energy that impinges the target material and exposes the nontarget material to extraneous laser output, the target material having ablation sensitivity to laser output in a first wavelength range and the nontarget material having optoelectric sensitivity to wavelengths in a second wavelength range that forms a subset of the first wavelength range such that exposure to a wavelength within the second wavelength range causes spurious optoelectric effects in the nontarget material that transiently obscure for a time interval concurrent with and following the laser pulse a true value of the measurable operational parameter of the device, wherein a third wavelength range of laser output is determined for which the nontarget material has substantial optoelectric insensitivity, the third wavelength range excluding the second wavelength range; the device is activated; a laser pulse is generated at a selected wavelength that falls within an overlap of the first and third wavelength ranges; the target material is impinged with the laser pulse having sufficient power to ablate a portion of the target material; and a true value of the operational parameter of the device is measured within the time interval.

The invention, therefore, provides a laser system and method that reduce or negate settling time during functional processing and thereby significantly increase product throughput.

For example, laser-processing an active device with laser output having a wavelength greater than 1.2 µm to functionally trim a target material with a silicon substrate or a position near a silicon-based structure forming part of the active device substantially eliminates the undesirable laser-induced performance shift or malfunction of the devices because silicon material and silicon-based structures and photo-receptive, light-sensing, and photo-electronic components are virtually "blind" to wavelengths greater than 1.2 µm.

Skilled persons will appreciate that the optoelectric sensitivity exhibited by such devices to laser output may stem from either a reaction to exposure of a particular material, itself, or a reaction to exposure of a structure due to its design as well as material composition. Such a structure may contain both target and nontarget materials, and the nontarget material may even overlay the target material. Accordingly, the term "target structure" is used herein to include at least one target material and the term "nontarget structure" is used herein to include at least one nontarget material.

The present invention also facilitates laser functional trimming of target materials or structures positioned on semiconductor materials, or resistors and/or capacitors on ceramic substrates that may have nearby semiconductor material-based active circuitry or photo-receptive, light-sensing, or photo-electronic components forming part of a device. The invention will permit circuit design restrictions to be eased, especially the heretofore required minimum spacing between components, and will allow for greater circuit compaction.

Existing film processing laser systems can be relatively inexpensive to modify to process silicon-based devices at an output in the 1.2 to 3.0 µm wavelength range. Similar modifications to generate laser outputs at wavelengths greater than 1.8 µm for processing indium gallium arsenide-based devices can be easily implemented. Laser devices that produce laser output within this wavelength range can be adapted for film processing, although they are conventionally employed in fiber optic communications, medical applications, military range finding, and atmospheric pollution monitoring.

Additional objects and advantages of the invention will be apparent from the following detailed description of preferred embodiments thereof, which proceeds with reference to the accompanying drawings.

BRIEF DESCRIPTION OF THE DRAWINGS

FIG. 7 shows graphical representations of the optical absorption properties of four different metals is versus wavelength.

DETAILED DESCRIPTION OF PREFERRED EMBODIMENTS

Figure 4:
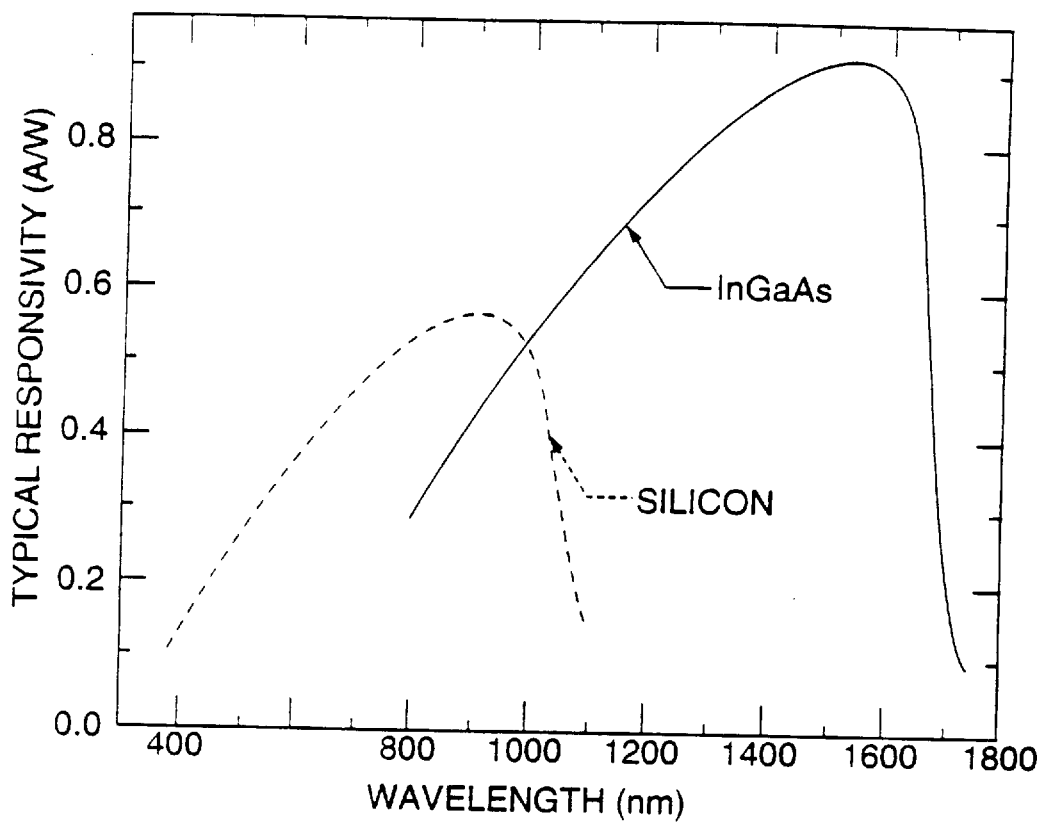
FIG. 4 shows typical responsivity curves of silicon and indium gallium arsenide-based detectors versus wavelength.
Figure 6:
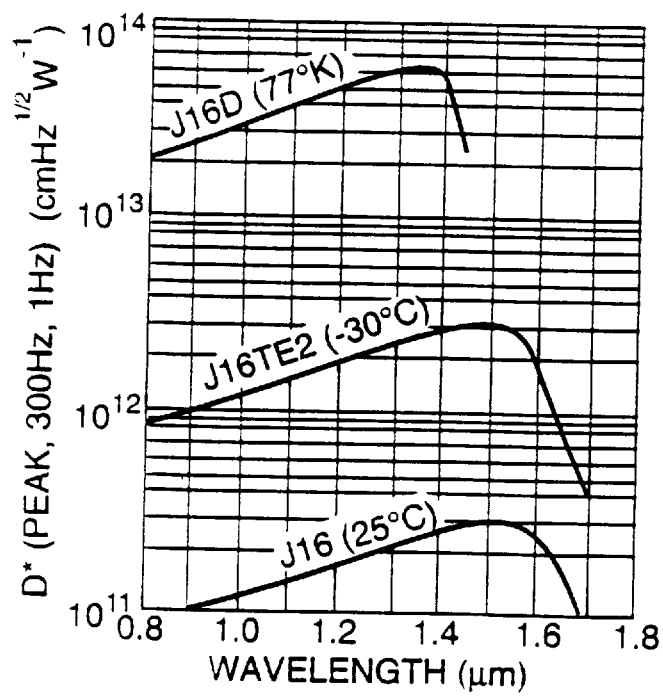
FIG. 6 shows typical responsivity curves of germanium-based detectors versus wavelength.
Figure 5:
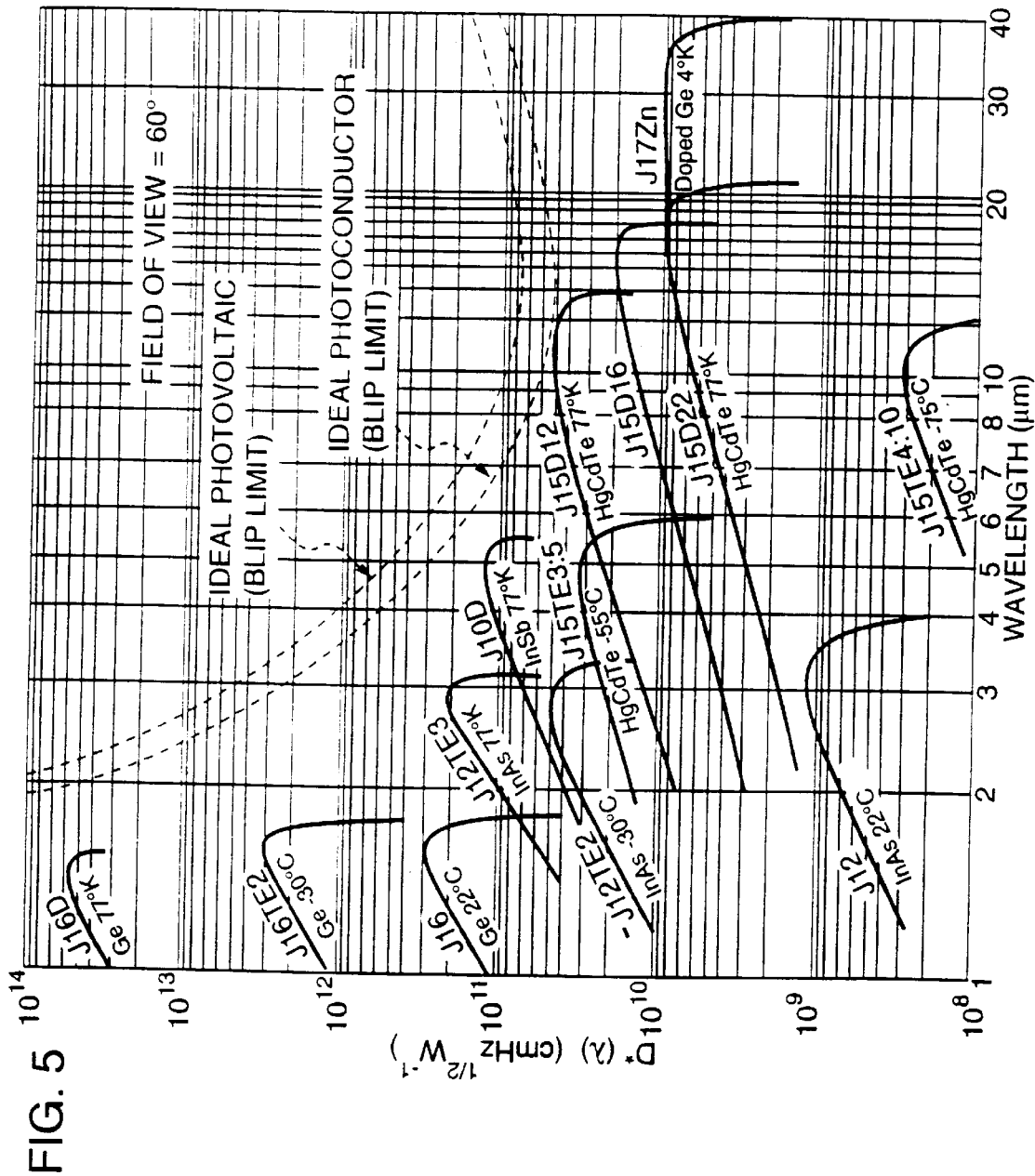
FIG. 5 shows typical responsivity curves of a variety of semiconductor material-based detectors versus wavelength.

FIGS. 4–6 graphically show the typical response curves of silicon-based, indium gallium arsenide-based, germanium-based, and other semiconductor material-based detectors versus wavelength. FIG. 4 is taken from page 3–39 of Oriel Corporation's catalog. FIG. 4 reveals that the silicon-based detector is optoelectrically sensitive to a wavelength range of about 0.3 $\mu$m to about 1.2 $\mu$m. Since the physics involved in the spectral response of the detector is the same as the response to light at different wavelengths of other silicon-based activated devices, FIG. 4 implies that silicon-based activated devices become "blind," i.e., optoelectrically insensitive, at wavelengths greater than about 1.2 $\mu$m. For the indium gallium arsenide-based device demonstrated in FIG. 4, the cutoff wavelength for optoelectric sensitivity is about 1.8 $\mu$m. Skilled persons will appreciate that the response curve of indium gallium arsenide is largely dependent on its composite percentage.

FIGS. 5 and 6 are taken from pages 1 and 2 of EG & G Optoelectronics' "Infrared Detectors" catalog, 1994. FIGS. 5 and 6 reveal that for germanium-based detectors, the cutoff wavelength for optoelectric sensitivity is about 1.7 $\mu$m.

FIG. 7 graphically shows the optical absorptance properties of different metals such as aluminum, nickel, tungsten, and platinum that may be used as film layers 24. FIG. 7 is a compilation of the relevant portions of absorptance graphs found in "Handbook of Laser Science and Technology," *Volume IV Optical Materials: Part* 2; Marvin J. Weber (CRC Press, 1986). FIG. 7 shows that metals, such as aluminum, nickel, tungsten, and platinum, absorb laser wavelengths ranging from below 0.1 to 3.0 $\mu$m, with aluminum absorptance being lower than that of the other metals. Metal nitrides (e.g., titanium nitride) and other high-conductivity, metal-like materials used to form film layers 24 generally have similar optical absorption characteristics. However, the absorption coefficients for such materials are not as readily available as are those for metals.

The graphs in FIGS. 4–7 reveal a wavelength range 40 ranging between about 1.2 to about 3 $\mu$m in which silicon semiconductor substrates, semiconductor-based devices, and other nontarget materials are almost blind and in which the optical absorption behavior of a variety of film and other target materials, especially metals, is sufficient for them to be processed. Skilled persons will also be able to identify preferred wavelength ranges for other semiconductor materials-based devices, such as about 1.7 to 3 $\mu$m for germanium-based devices, depending on similar considerations.

While laser beams of shorter wavelengths within the 1.2 to 3 $\mu$m wavelength range can be focused to smaller diameters to obtain narrower trims in film layers 24 along paths 14, wavelengths such as 1.32 $\mu$m and 1.34 $\mu$m are sufficiently long to eliminate light-induced performance drifting or malfunctions of silicon-based devices, and are preferred for most functional processing operations. The choice of 1.32 $\mu$m or 1.34 $\mu$m is also somewhat predicated on laser source availability and other complexities familiar to those skilled in the art.

In a preferred embodiment, a conventional diode-pumped, solid-state laser with a lasant crystal such as Nd:YAG, Nd:YLF, ND:YAP, or Nd:YVO is configured to produce output in the 1.2 to 3.0 $\mu$m wavelength range. Each such laser design employs resonator mirrors with appropriate dichroic coatings to be highly transmissive to the most conventional wavelength of the lasant crystal but have desired reflectivity at a selected wavelength within the range 1.2 to 3 $\mu$m and preferably at 1.32 $\mu$m or 1.34 $\mu$m. Such dichroic coatings would suppress laser action at the most conventional wavelength of the lasant crystal, such as 1.06 $\mu$m for Nd:YAG, and enhance laser action at the selected wavelength, preferably 1.32 $\mu$m for Nd:YAG.

In another preferred embodiment, a diode-pumped or arc lamp-pumped solid-state laser having a lasant crystal of YAG doped with other dopants such as holmium (laser output at 2.1 $\mu$m) or erbium (2.94 $\mu$m), or codoped with chromium, thalium, and holmium (2.1 $\mu$m), could be employed to deliver laser output within the 1.2 to 3 $\mu$m wavelength range.

In still another preferred embodiment, nonlinear conversion schemes such as Raman shifting or optical parametric oscillation could be adapted to convert conventional laser wavelengths of about 1 $\mu$m into wavelengths in a range of 1.2 to 3 $\mu$m.

Preferably, all of the transmissive optics in a delivery path of the laser output beam are anti-reflection coated for the selected wavelength. In addition, photo-electric-based laser power or energy monitoring devices are changed to be responsive to the selected longer wavelength. Other minor optical modifications to compensate for changes in laser output focusing is characteristics are preferred and known to those having skill in the art.

Figure 8:
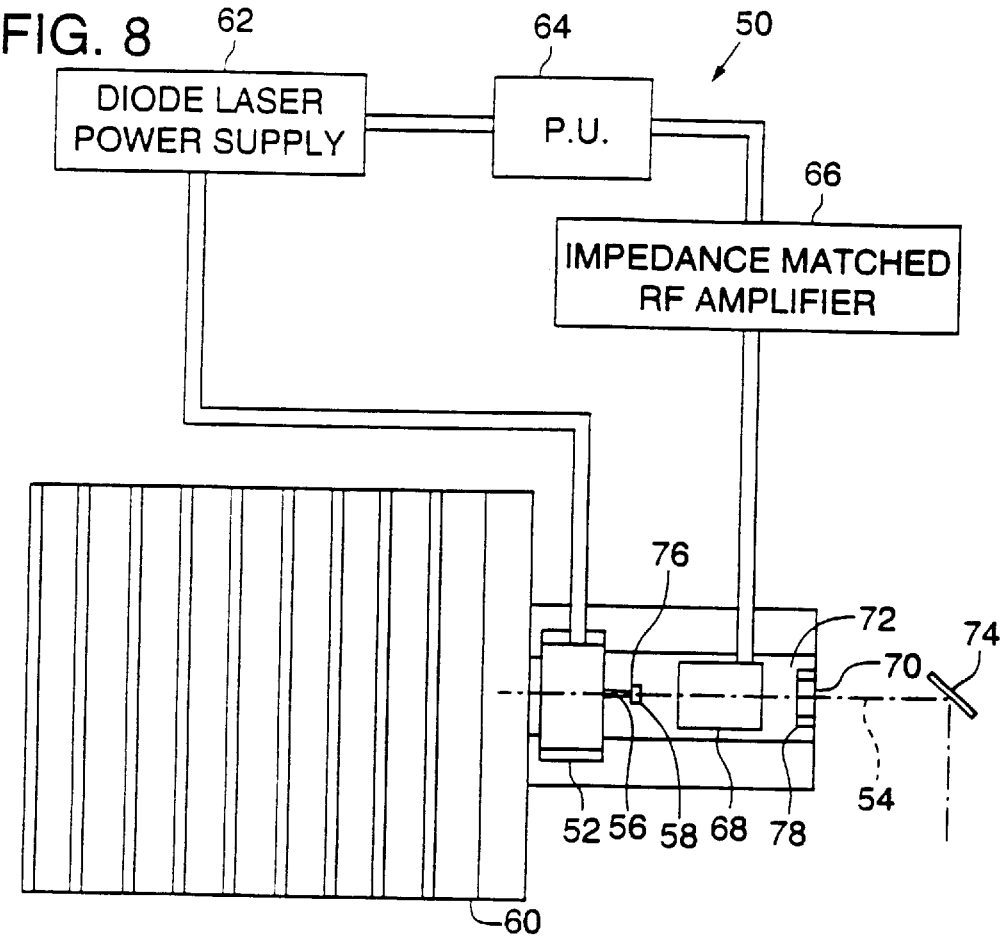
FIG. 8 is a plan view of a pictorial diagram of a preferred embodiment of a laser system for employing the present invention.

One skilled in the art will also recognize that pumping schemes, such as higher output power diode lasers or arc lamp-pumping, may be employed to compensate for the lower gain for lasant crystals such as Nd:YAG or Nd:YLF at 1.2 to 3 μm wavelengths. For example, with reference to an embodiment of a laser system 50 shown in FIG. 8, the output (preferably 3 watts or greater) of a high-power AlGaAs laser 52 may be funneled along optic axis 54 through a nonimaging concentrator 56 composed of a high-refractive index, crystalline dielectric material and then coupled into an Nd:YLF lasant crystal 58. This method is disclosed in U.S. Pat. No. 5,323,414 of Baird, DeFreez, and Sun for "Laser System and Method for Employing a Nonimaging Concentrator," which is assigned to the assignee of the present application.

Preferably, laser 52 is positioned against a heat sink 60 and is powered by a diode laser power supply 62 that is controlled by a processing unit 64. Processing unit 64 is also connected to an impedance-matched RF amplifier 66 and controls signals delivered to a transducer coupled to a Q-switch 68. Q-switch 68 is preferably positioned between lasant crystal 58 and an output coupler 70 within a resonator cavity 72. A beam positioning and focusing system 74 may be employed to direct laser output to a desired position on film structure 22 or other target material. Pumping, Q-switching, targeting, and beam positioning of laser system 50 of the preferred embodiments are accomplished through conventional techniques well-known to persons skilled in the art.

An input mirror coating 76 on lasant crystal 58 and an output mirror coating 78 on output coupler 70 are preferably highly transmissive at the conventional 1.047 μm YLF emission wavelength. In addition, input mirror coating 76 is transmissive to the AlGaAs emission wavelength range and reflective at about 1.32 μm, and coating 78 is partly transmissive at 1.32 μm to permit laser operation.

Skilled persons will appreciate that the above-described laser systems can also be employed at wavelengths longer than 1.2 μm to process or trim thin film structures, such as resistors, capacitors, inductors, microwave stubs, or other components, in activated integrated circuit devices to desired performance or functional parameters. Laser output in the 1.2 to 3 μm range, for example, can effectively trim resistor material, such as nickel chromide, tantalum nitride, cesium silicide, disilicide, polycide, and other commonly used film materials, but does not substantially stimulate undesirable electron-hole pairs and photocurrents in any type of silicon semiconductor material-based structures that might be affected by conventional laser wavelengths. As a consequence, virtually no device settling time is required between laser trims and the functional measurements of the active devices, so the functional measurements can be achieved almost concurrently.

Skilled persons will also appreciate that the preferred wavelengths are generally invisible to any adjacent active devices and would excite fewer electron-hole pair carriers to affect the performance of adjacent devices, so device design restrictions could be eased and circuit compaction could be increased to provide smaller devices or circuits both for integrated circuits, or hybrid integrated circuits.

Figure 1:
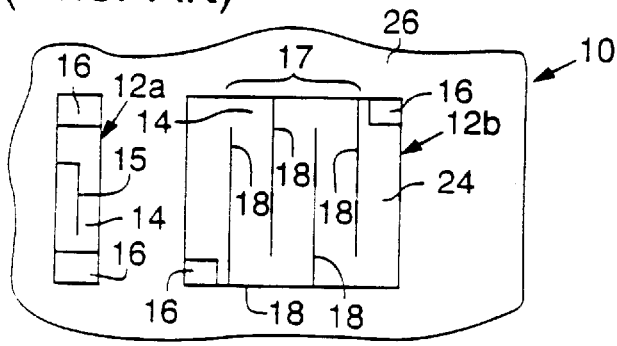
FIG. 1 is a plan view of a portion of an integrated circuit depicting resistors having a resistive film path between metal contacts.
Figure 2:
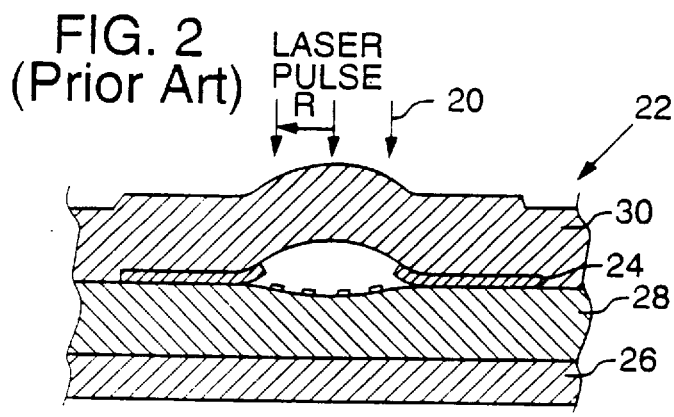
FIG. 2 is a fragmentary cross-sectional side view of a conventional semiconductor film structure receiving a laser pulse characterized by a particular energy distribution.
Figure 3:
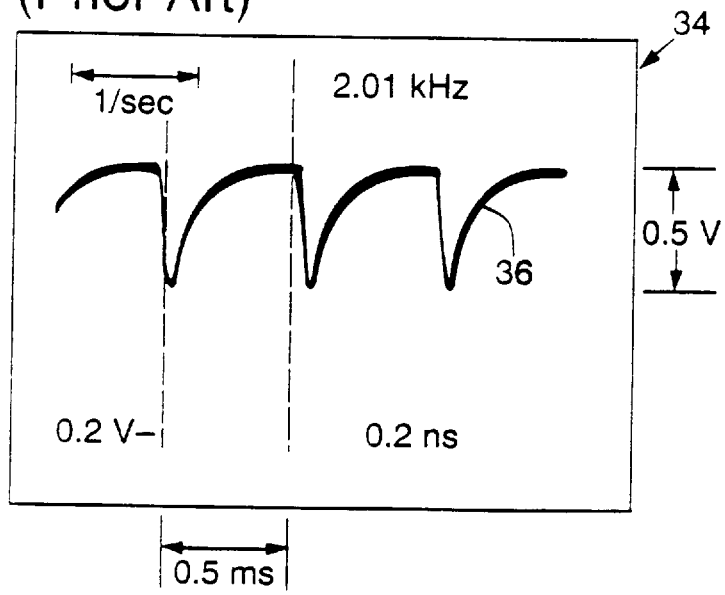
FIG. 3 is an oscilloscope trace showing momentary dips in the output voltage of a voltage regulator device undergoing prior art functional laser processing.
Figure 9:
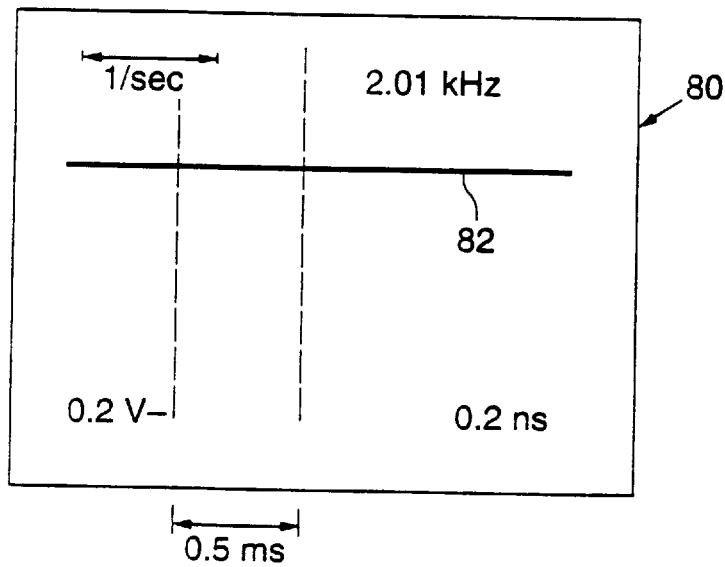
FIG. 9 is an oscilloscope trace showing the constant output voltage of a voltage regulator device undergoing functional laser processing of the present invention.

FIG. 9 is an oscilloscope trace 80 showing an output voltage 82 of a typical voltage regulator device undergoing laser functional processing in accordance with the present invention. With reference to FIG. 4, laser output pulses at the wavelength of 1.32 μm at 2.01 kHz were directed at a resistor of an activated voltage regulator (identical to the voltage regulator discussed with respect to FIG. 3). The straight line of oscilloscope trace 80 depicting the output voltage 82 of the voltage regulator shows no momentary dips in output voltage. Accordingly, measurements can be made immediately after laser impingement, or at any time before or after laser impingement to obtain a true measurement value of the output voltage. Moreover, laser output pulses can be applied at shorter intervals, i.e., at a higher repetition rate, because no recovery time is required before measurements can be obtained. Thus, much higher processing throughput can be realized.

Another example of functional processing in accordance with the present invention includes laser trimming of a frequency band-pass filter to within its frequency response specification. The filter is activated, a frequency scanner generates input signals for the filter at different frequencies, and the output signal of the filter is measured by a voltmeter to determine the filter's frequency response. A laser output pulse impinges a component of the filter, and a central processing unit determines whether an additional impingement is required based on the measurement of the output signal. A third example employs the present invention to trim a resistor of an activated A/D or D/A converter to achieve output with specified conversion accuracy. Skilled persons will appreciate the numerous applications of functional processing where elimination of device settling time would be advantageous.

It will be obvious to those having skill in the is art that many changes may be made to the details of the above-described embodiments of this invention without departing from the underlying principles thereof. Accordingly, it will be appreciated that this invention is also applicable to laser-based operations for other semiconductor substrate and film materials, as well as laser-based operations outside the semiconductor industry, for removal of one or more materials from a multimaterial device without causing performance drifting or malfunction of certain types of active devices. The scope of the present invention should, therefore, be determined only by the following claims.

We claim:

1. A laser functional trimming system for modifying with laser output a measurable operational parameter of an activated electronic device while preventing a spurious optoelectric response in the device, the device including a target material and a nontarget material positioned within optical proximity to the target material, the laser output including a laser pulse having a spatial distribution of energy that impinges the target material and exposes the nontarget material to extraneous laser output, the target material having ablation sensitivity to laser output in a first wavelength range and the nontarget material having optoelectric sensitivity to wavelengths in a second wavelength range that forms a subset of the first wavelength range such that exposure to a wavelength within the second wavelength range causes spurious optoelectric effects in the nontarget material that transiently obscure for a time interval concurrent with and following the laser pulse a true value of the measurable operational parameter of the device, comprising:

an electrical input for activating the device;

a laser that generates laser output at a selected wavelength in a third wavelength range for which the nontarget material has substantial optoelectric insensitivity, the third wavelength range overlapping the first wavelength range and excluding the second wavelength range;

a beam positioner to direct at the target structure a laser pulse at the selected wavelength and at a power sufficient to ablate a portion of the target material while the device is operating; and a detector for measuring within the time interval a true value of the operational parameter of the device while the device is operating.

2. The laser system of claim 1 further comprising:

a computer controlled system for comparing the true value of the measurable operational parameter with a preselected value for the operational parameter of the device and for determining whether the target material requires additional impinging with laser output to satisfy the preselected value for the operational parameter of the device.

3. The system of claim 2 in which the device is activated prior to generation of laser output and remains operating until at least the preselected value for the operational parameter of the device is satisfied.

4. The system of claim 1 in which the target material forms part of a resistor, capacitor, or inductor.

5. The system of claim 1 in which the nontarget material comprises a portion of an adjacent electronic structure.

6. The system of claim 5 in which the adjacent electronic structure comprises a semiconductor material-based substrate or a ceramic substrate.

7. The system of claim 1 in which the target material or nontarget material comprises a portion of a photo-electric sensing component.

8. The system of claim 1 in which the detector obtains a true value of the operational parameter of the device immediately after pulse impingement of the target material without a delay imposed by device settling time.

9. The system of claim 1 in which the detector obtains a true value of the operational parameter of the device substantially instantaneously subsequent to laser pulse impingement of the target material.

10. The system of claim 1 in which the nontarget material comprises silicon and the third wavelength range comprises wavelengths between 1.2 and 3 $\mu$m.

11. The system of claim 1 in which the nontarget material comprises germanium and the third is wavelength range comprises wavelengths between 1.7 and 3 $\mu$m.

12. The system of claim 1 in which the target material forms part of a target structure and the nontarget material comprises a substrate of the target structure, wherein the nontarget material comprises silicon, germanium, or indium gallium arsenide, or semiconductor or ceramic material and the target material comprises aluminum, titanium, nickel, copper, tungsten, platinum, gold, nickel chromide, tantalum nitride, titanium nitride, cesium silicide, doped polysilicon, disilicide, or polycide.

* * * * *

UNITED STATES PATENT AND TRADEMARK OFFICE
CERTIFICATE OF CORRECTION

PATENT NO. : 5,808,272

DATED : September 15, 1998

INVENTOR(S) : Yunlong Sun and
Edward J. Swenson

It is certified that error appears in the above-indentified patent and that said Letters Patent is hereby corrected as shown below:

Column 5, line 31, delete "is".

Column 6, line 35, change "Nd:YVO" to --Nd:YVO$_4$--.

Column 8, line 26, delete "is".

Column 10, line 13, delete "is".

Signed and Sealed this

Twenty-ninth Day of June, 1999

Attest:

Q. TODD DICKINSON

*Attesting Officer*    *Acting Commissioner of Patents and Trademarks*

(12) EX PARTE REEXAMINATION CERTIFICATE (5873rd)
United States Patent
Sun et al.

(10) Number: US 5,808,272 C1
(45) Certificate Issued: Aug. 28, 2007

(54) LASER SYSTEM FOR FUNCTIONAL TRIMMING OF FILMS AND DEVICES

(75) Inventors: Yunlong Sun, Portland, OR (US); Edward J. Swenson, Portland, OR (US)

(73) Assignee: Electro Scientific Industries, Inc., Portland, OR (US)

Reexamination Request:
No. 90/007,911, Feb. 2, 2006

Reexamination Certificate for:
| | |
|---|---|
| Patent No.: | 5,808,272 |
| Issued: | Sep. 15, 1998 |
| Appl. No.: | 08/959,140 |
| Filed: | Oct. 28, 1997 |

Certificate of Correction issued Jun. 29, 1999.

Related U.S. Application Data

(63) Continuation of application No. 08/538,073, filed on Oct. 2, 1995, now Pat. No. 5,685,995, which is a continuation-in-part of application No. 08/343,779, filed on Nov. 22, 1994, now Pat. No. 5,569,398, which is a continuation-in-part of application No. PCT/US93/08484, filed on Sep. 10, 1993.

(51) Int. Cl.
*B23K 26/06* (2006.01)
*B23K 26/00* (2006.01)

(52) U.S. Cl. ................................ 219/121.68; 438/799
(58) Field of Classification Search ................ None
See application file for complete search history.

(56) References Cited

U.S. PATENT DOCUMENTS

| | | |
|---|---|---|
| 4,150,366 A | 4/1979 | Price |
| 4,399,345 A | 8/1983 | Lapham et al. |

FOREIGN PATENT DOCUMENTS

| | | |
|---|---|---|
| JP | 62160726 A | 7/1987 |
| JP | H07-106426 A | 4/1995 |
| JP | 62-161491 | * 7/1997 |
| WO | WO 94/06182 | 3/1994 |

OTHER PUBLICATIONS

Oriel Corporation light sources, monochromators & spectrographs, detectors & detection systems, fiber optics; 1994, pp. 3–37 to 3–39.*
Barcey, et al., "Reducing Optoelectric Response When Functionally Tuning Thin–Film Resistors on Silicon IC's," IEEE Electronic Components and Technology Conference, Proceedings pp. 242–246 (May 1996).
Camilleri, et al., "Functional tuning of hybrids," Advanced Packaging, (Jan. 2002) PennWell Corp., Tulsa, OK.
CRC, Handbook of Chemistry & Physics, 49th ed. (1968–1969) p. E–102, Chemical Rubber Co., Cleveland, OH.
Kestenbaum et al., "Photoexcitation Effects During Laser Trimming of Thin–Film Resistors on Silicon," IEEE Transactions on Components, Hybrids & Manufacturing Technology, vol. CHMT–3, No. 1, pp. 166–171 (Mar. 1980).
Sun et al., "Reducing Photoelectric Response When Functionally Trimming With Lasers," Proceedings of the IEEE, vol. 90, No. 10, pp. 16201626 (Oct. 2002).

(Continued)

*Primary Examiner*—Kiley Stoner

(57) ABSTRACT

A laser system (50) and processing method exploit a wavelength range (40) in which devices, including any semiconductor material-based devices (10) affected by conventional laser wavelengths and devices having light-sensitive or photo-electronic portions integrated into their circuits, can be effectively functionally trimmed without inducing performance drift or malfunctions in the processed devices. True measurement values of operational parameters of the devices can, therefore, be obtained without delay for device recovery, i.e., can be obtained substantially instantaneously with laser impingement. Accordingly, the present invention allows faster functional laser processing, eases geometric restrictions on circuit design, and facilitates production of denser and smaller devices.

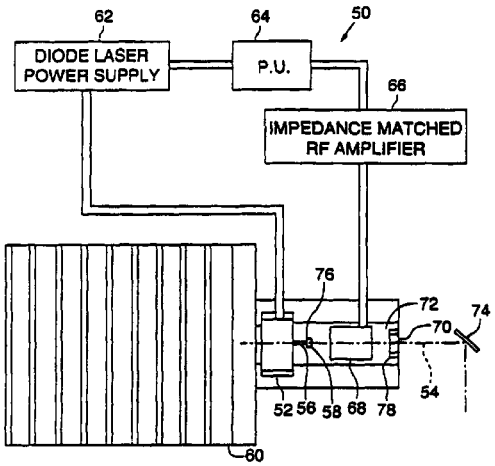

OTHER PUBLICATIONS

Wagner, "Functional Laser Trimming: An Overview", (1986) SPIE vol. 611 Laser Processing of Semiconductors and Hybrids pp. 8–17.

Moss, "Optical Properties of Semi–Conductors", (1959) Academic Press, Inc. pp. 53–54, 96–99, 113–128, 129–130, 145–150 and 251–253.

* cited by examiner

EX PARTE REEXAMINATION CERTIFICATE ISSUED UNDER 35 U.S.C. 307

NO AMENDMENTS HAVE BEEN MADE TO THE PATENT

AS A RESULT OF REEXAMINATION, IT HAS BEEN DETERMINED THAT:

The patentability of claims 1–12 is confirmed.

* * * * *